United States Patent
Li et al.

(10) Patent No.: US 11,573,960 B2
(45) Date of Patent: Feb. 7, 2023

(54) APPLICATION-BASED QUERY TRANSFORMATIONS

(71) Applicant: International Business Machines Corporation, Armonk, NY (US)

(72) Inventors: Shuo Li, Beijing (CN); Xiaobo Wang, Beijing (CN); Hong Mei Zhang, Beijing (CN); Sheng Yan Sun, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/205,044

(22) Filed: Mar. 18, 2021

(65) Prior Publication Data
US 2022/0300507 A1    Sep. 22, 2022

(51) Int. Cl.
| | |
|---|---|
| *G06F 11/34* | (2006.01) |
| *G06F 16/2453* | (2019.01) |
| *G06F 16/2455* | (2019.01) |
| *G06F 16/248* | (2019.01) |
| *G06F 16/28* | (2019.01) |

(52) U.S. Cl.
CPC .... *G06F 16/24534* (2019.01); *G06F 11/3409* (2013.01); *G06F 16/248* (2019.01); *G06F 16/24553* (2019.01); *G06F 16/287* (2019.01)

(58) Field of Classification Search
CPC .......... G06F 16/24534; G06F 11/3409; G06F 16/24553; G06F 16/248; G06F 16/287
See application file for complete search history.

(56) References Cited

U.S. PATENT DOCUMENTS

| | | | | |
|---|---|---|---|---|
| 10,268,753 | B2 * | 4/2019 | Bar-Or | G06F 16/248 |
| 10,331,666 | B1 * | 6/2019 | Waas | G06F 9/52 |
| 10,437,843 | B2 | 10/2019 | Nguyen et al. | |
| 10,592,506 | B1 | 3/2020 | Thombre et al. | |
| 11,308,086 | B2 * | 4/2022 | Cheng | G06F 16/24544 |
| 11,314,740 | B1 * | 4/2022 | Hwang | G06F 16/24549 |
| 2015/0154256 | A1 * | 6/2015 | McKenna | G06F 16/24542 |
| | | | | 707/718 |
| 2016/0034529 | A1 * | 2/2016 | Nguyen | G06F 16/24549 |
| | | | | 707/713 |

(Continued)

OTHER PUBLICATIONS

Mell et al., "The NIST Definition of Cloud Computing", Recommendations of the National Institute of Standards and Technology, Special Publication 800-145, Sep. 2011, 7 pages.

*Primary Examiner* — Jorge A Casanova
(74) *Attorney, Agent, or Firm* — Daniel M. Yeates

(57) ABSTRACT

A computer-implemented method provides application-based query transformations. The method includes determining an application is initiated. The method includes identifying a set of execution units included in the application. The execution units are based on of a set of queries in the application and a set of actions in the application. The method also includes building a query dependency graph (QDG) comprising a plurality of nodes, wherein each node of the plurality of nodes is correlated to an execution unit, and each node is linked to at least one additional node, the link indicating a relative execution order and a common attribute each node and the additional node. The method includes merging, based on a performance architecture, two or more of the set of execution units into a section. The method includes processing the application according to the QDG.

17 Claims, 6 Drawing Sheets

(56) References Cited

U.S. PATENT DOCUMENTS

| | | | |
|---|---|---|---|
| 2017/0286526 A1* | 10/2017 | Bar-Or | G06F 16/288 |
| 2018/0189349 A1 | 7/2018 | Sirohi et al. | |
| 2018/0253471 A1 | 9/2018 | Ball | |
| 2018/0329958 A1* | 11/2018 | Choudhury | G06F 16/2456 |
| 2019/0079972 A1* | 3/2019 | Lee | G06F 9/4552 |
| 2019/0146970 A1* | 5/2019 | Chamieh | G06F 16/9024 |
| | | | 707/718 |
| 2019/0303379 A1 | 10/2019 | Waas et al. | |
| 2019/0362007 A1* | 11/2019 | Jeong | G06F 16/24545 |
| 2020/0311076 A1* | 10/2020 | Lee | G06F 16/24537 |

\* cited by examiner

APPLICATION-BASED QUERY TRANSFORMATIONS

BACKGROUND

The present disclosure relates to database management, and, more specifically, to performing query transformations based on the application that sends the query.

Modern database systems can contain relatively large amounts of data. This data can be processed, updated, retrieved, and/or otherwise used for many purposes. Queries can be used to access/process the stored data.

SUMMARY

Disclosed is a computer-implemented method for application-based query transformations. The method includes determining an application is initiated. The method further includes identifying a set of execution units included in the application, wherein the set of execution units is comprised of a set of queries in the application and a set of actions in the application. The method also includes building, based on the set of execution units, a query dependency graph (QDG) comprising a plurality of nodes, wherein each node of the plurality of nodes is correlated to an execution unit, and each node is linked to at least one additional node, the link indicates a relative execution order and a common attribute each node and the additional node. The method includes merging, based on a performance architecture, two or more of the set of execution units into a section. The method also includes processing the application according to the QDG. Further aspects of the present disclosure are directed to computer program products containing functionality consistent with the method described above.

Also disclosed is a system configured to perform application-based query transformations. The system includes a processor, and a computer-readable storage medium communicatively coupled to the processor and storing program instructions. The system also includes a performance architecture that includes three levels, a first level is a database internal level, a second level is a database interact level, and a third level is a database external level, wherein each level is configured to merge two or more queries. The system further includes a compiler. The compiler can identify a set of execution units in an application that include of a set of queries in the application and a set of actions in the application. The compiler can also assign each action to a level of the performance architecture and build, based on the set of execution units, a QDG for the application. The QDG can include a plurality of nodes where each node correlated to an execution unit of the set of execution units, and each node includes a link to at least one additional node of the plurality of nodes. The link indicates a relative order of operation of the node and the at least one additional node. The compiler can merge two or more execution units into a section, wherein the merging is based on the level assigned to each action and on the performance architecture. The system includes a database. The database can receive the section from the compiler, process the section according to the QDG, and return the processed section to the compiler.

The present Summary is not intended to illustrate each aspect of every implementation and/or every embodiment of the present disclosure.

BRIEF DESCRIPTION OF THE DRAWINGS

Various embodiments are described herein with reference to different subject-matter. In particular, some embodiments may be described with reference to methods, whereas other embodiments may be described with reference to apparatuses and systems. However, a person skilled in the art will gather from the above and the following description that, unless otherwise notified, in addition to any combination of features belonging to one type of subject-matter, also any combination between features relating to different subject-matter, in particular, between features of the methods, and features of the apparatuses and systems, are considered as to be disclosed within this document.

The aspects defined above, and further aspects disclosed herein, are apparent from the examples of one or more embodiments to be described hereinafter and are explained with reference to the examples of the one or more embodiments, but to which the invention is not limited. Various embodiments are described, by way of example only, and with reference to the following drawings.

DETAILED DESCRIPTION

Figure 1:
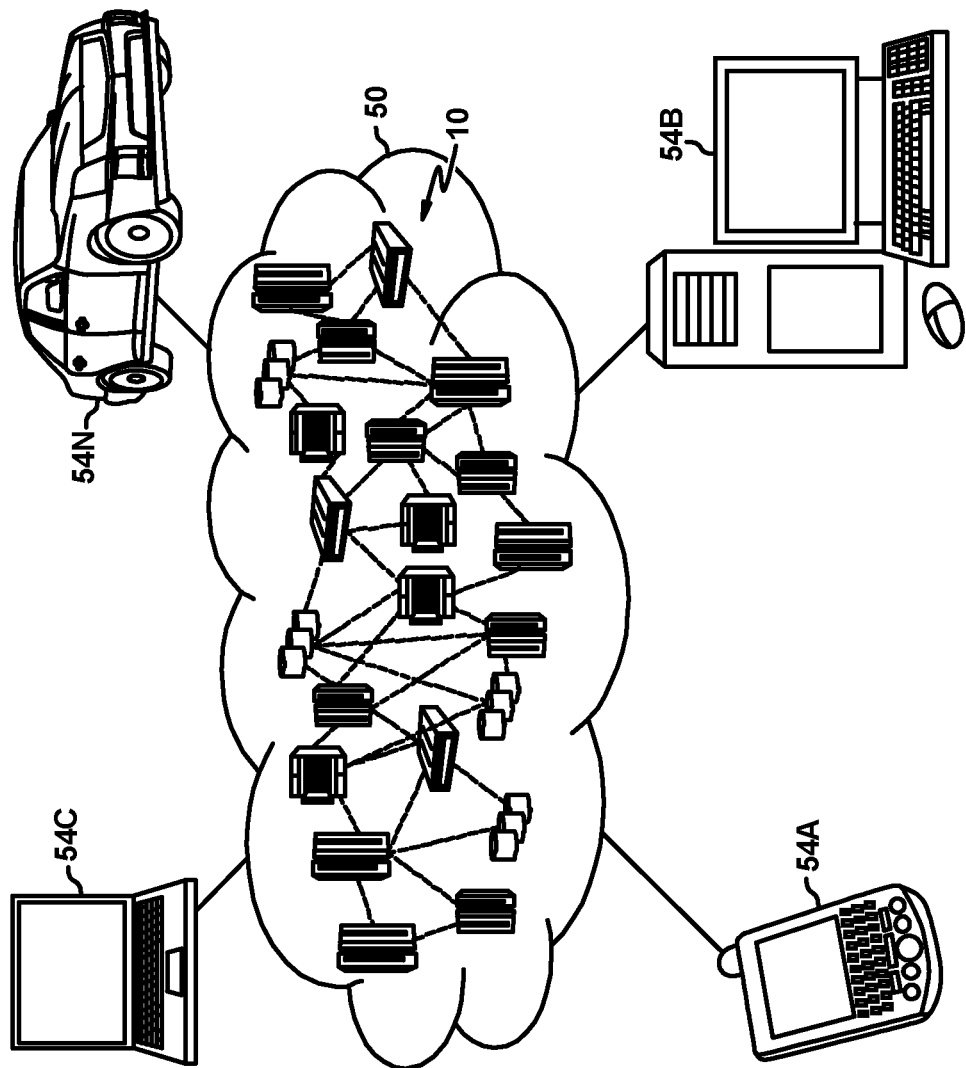
FIG. 1 depicts a cloud computing environment according to an embodiment of the present invention.

Modern database systems can contain relatively large amounts of data. This data can be processed, updated, retrieved, and/or otherwise used for many purposes. Queries can be used to process the data. In some embodiments, the queries use standard query language (SQL). SQL is a programming language designed for managing (storing and/or retrieving) data stored in one or more databases. Various database systems can use additional query languages to access and/or update a database. Because the volume of data is so large, small changes in the processing of queries can have a large effect on the overall efficiency of database systems.

In order to increase the efficiency and effectiveness of processing queries, embodiments of the present disclosure can perform application-based query transformation to reduce network traffic and increase the efficiency of database systems.

Cloud Computing in General

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and personal digital assistants (PDAs)).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
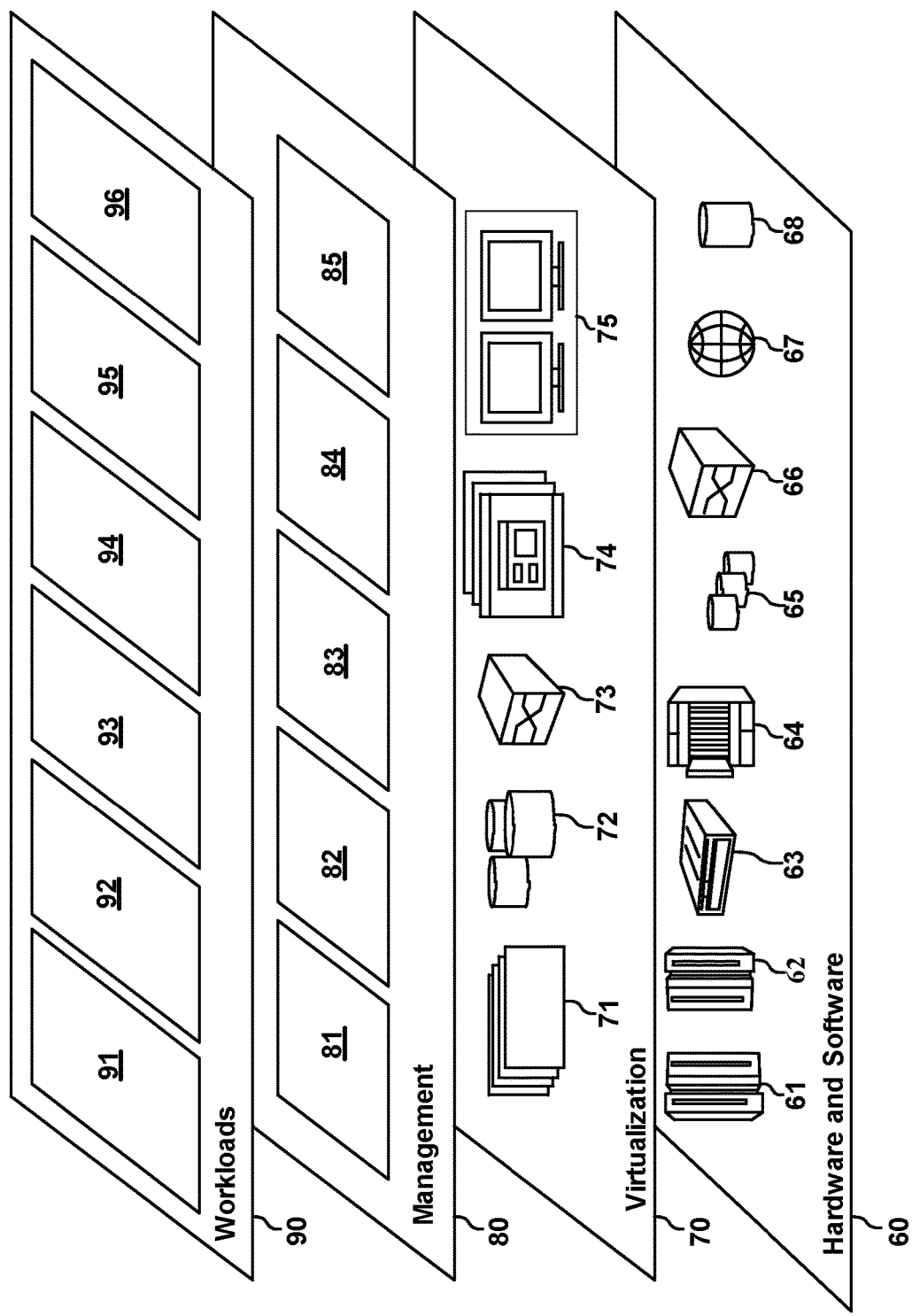
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application-based query transformations 96.

Data Processing System in General

Figure 3:
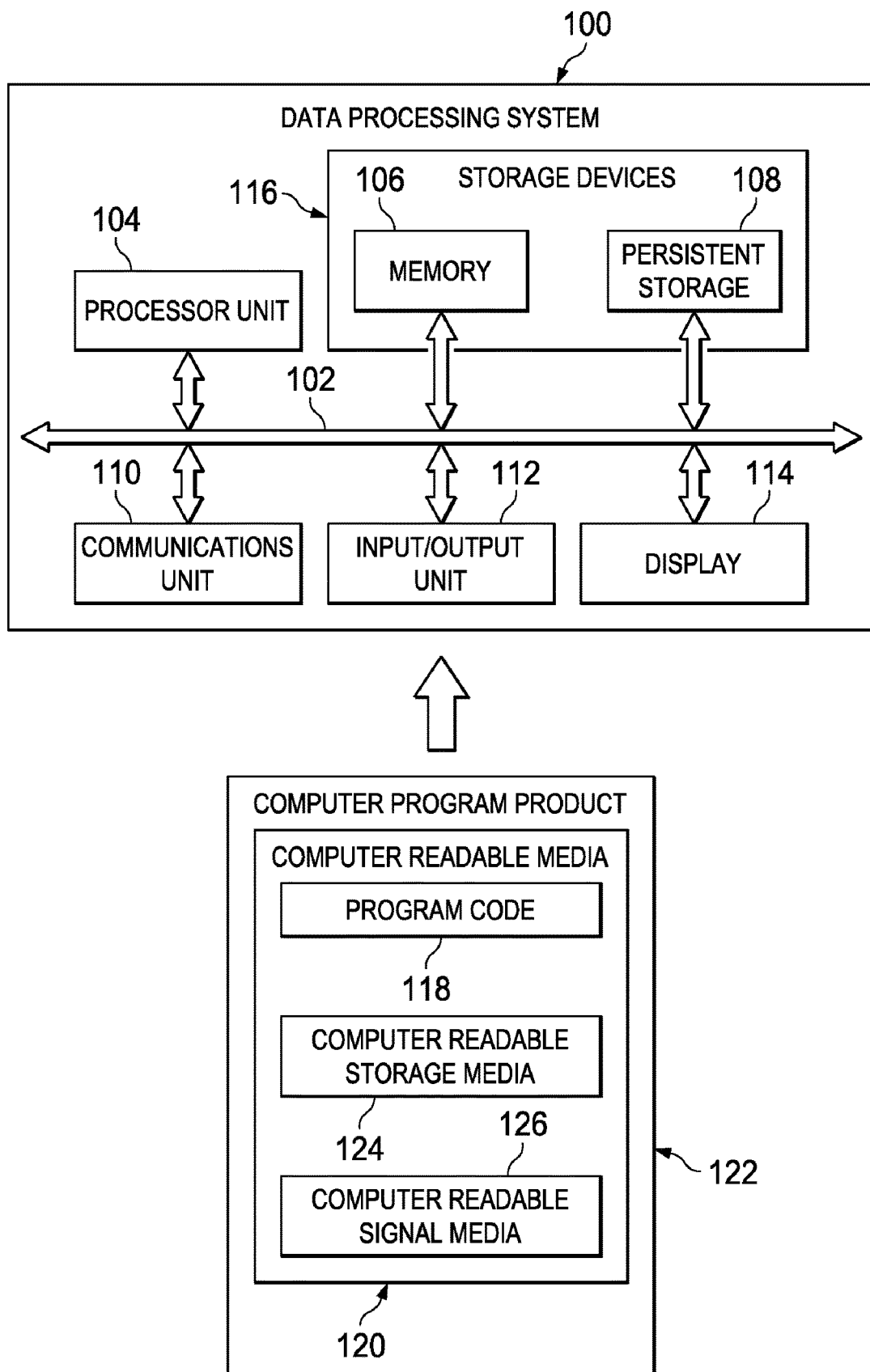
FIG. 3 is a block diagram of a DPS according to one or more embodiments disclosed herein.

FIG. 3 is a block diagram of an example data processing system (DPS) according to one or more embodiments. The DPS may be used as a cloud computing node 10. In this illustrative example, the DPS 100 may include communications bus 102, which may provide communications between a processor unit 104, a memory 106, persistent storage 108, a communications unit 110, an Input/Output (I/O) unit 112, and a display 114.

The processor unit 104 serves to execute instructions for software that may be loaded into the memory 106. The processor unit 104 may be a number of processors, a multi-core processor, or some other type of processor, depending on the particular implementation. A number, as used herein with reference to an item, means one or more items. Further, the processor unit 104 may be implemented using a number of heterogeneous processor systems in which a main processor is present with secondary processors on a single chip. As another illustrative example, the processor unit 104 may be a symmetric multi-processor system containing multiple processors of the same type.

The memory 106 and persistent storage 108 are examples of storage devices 116. A storage device may be any piece of hardware that is capable of storing information, such as, for example without limitation, data, program code in functional form, and/or other suitable information either on a temporary basis and/or a permanent basis. The memory 106, in these examples, may be, for example, a random access memory or any other suitable volatile or non-volatile storage device. The persistent storage 108 may take various forms depending on the particular implementation.

For example, the persistent storage 108 may contain one or more components or devices. For example, the persistent storage 108 may be a hard drive, a flash memory, a rewritable optical disk, a rewritable magnetic tape, or some combination of the above. The media used by the persistent storage 108 also may be removable. For example, a removable hard drive may be used for the persistent storage 108.

The communications unit 110 in these examples may provide for communications with other DPSs or devices. In these examples, the communications unit 110 is a network interface card. The communications unit 110 may provide communications through the use of either or both physical and wireless communications links.

The input/output unit 112 may allow for input and output of data with other devices that may be connected to the DPS 100. For example, the input/output unit 112 may provide a connection for user input through a keyboard, a mouse, and/or some other suitable input device. Further, the input/output unit 112 may send output to a printer. The display 114 may provide a mechanism to display information to a user.

Instructions for the operating system, applications and/or programs may be located in the storage devices 116, which are in communication with the processor unit 104 through the communications bus 102. In these illustrative examples, the instructions are in a functional form on the persistent storage 108. These instructions may be loaded into the memory 106 for execution by the processor unit 104. The processes of the different embodiments may be performed by the processor unit 104 using computer implemented instructions, which may be located in a memory, such as the memory 106.

These instructions are referred to as program code, computer usable program code, or computer readable program code that may be read and executed by a processor in the processor unit 104. The program code in the different embodiments may be embodied on different physical or tangible computer readable media, such as the memory 106 or the persistent storage 108.

The program code 118 may be located in a functional form on the computer readable media 120 that is selectively removable and may be loaded onto or transferred to the DPS 100 for execution by the processor unit 104. The program code 118 and computer readable media 120 may form a computer program product 122 in these examples. In one example, the computer readable media 120 may be computer readable storage media 124 or computer readable signal media 126. Computer readable storage media 124 may include, for example, an optical or magnetic disk that is inserted or placed into a drive or other device that is part of the persistent storage 108 for transfer onto a storage device, such as a hard drive, that is part of the persistent storage 108. The computer readable storage media 124 also may take the form of a persistent storage, such as a hard drive, a thumb drive, or a flash memory, that is connected to the DPS 100. In some instances, the computer readable storage media 124 may not be removable from the DPS 100.

Alternatively, the program code 118 may be transferred to the DPS 100 using the computer readable signal media 126. The computer readable signal media 126 may be, for example, a propagated data signal containing the program code 118. For example, the computer readable signal media 126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, the program code 118 may be downloaded over a network to the persistent storage 108 from another device or DPS through the computer readable signal media 126 for use within the DPS 100. For instance, program code stored in a computer readable storage medium in a server DPS may be downloaded over a network from the server to the DPS 100. The DPS providing the program code 118 may be a server computer, a client computer, or some other device capable of storing and transmitting the program code 118.

The different components illustrated for the DPS 100 are not meant to provide architectural limitations to the manner in which different embodiments may be implemented. The different illustrative embodiments may be implemented in a DPS including components in addition to or in place of those illustrated for the DPS 100. Other components shown in FIG. 1

Modern database systems can contain relatively large amounts of data. This data can be processed, updated, retrieved, and/or otherwise used for many purposes. Queries can be used to process the data. In some embodiments, the queries use SQL, which is a programming language designed for managing (storing and/or retrieving) data stored in one or more databases. Various database systems can use additional query languages to access and/or update a database.

The amount of data that needs to be accessible in a database system can lead to distributed database systems. The rise of cloud computing has increased the number of remote/distributed database systems. A distributed database can be in a different physical location from the application/host that is accessing the data. Remote can mean accesses through a network. The network can introduce additional time into the processing. In some situations, the network can be a limiting factor in processing the queries.

In some embodiments, an application can generate and/or execute a string of queries. In a string, each subsequent query can be related to and/or dependent on a previous query and/or other action performed on the query data. For example, a first query can retrieve data from a first table and a first column. The retrieved data can be manipulated by the application. A second query can write the manipulated/updated data into the database. A third query can rely on the manipulated data and so on.

For each query in the string, a query manager needs to package up the query, and sends the query to the database. The database will execute the query and return the results. The query manager then writes the results into the application, and performs a subsequent action dictated by the application on the retrieved data. The process is then repeated for a subsequent query in the query string. Any reduction in data being transferred over the network between the host and the database and/or a reduction in I/O actions (e.g., writing the results of the first query into the application runtime) in the host can reduce the overall processing time. Additionally, it can reduce overall network traffic. Thus, the overall efficiency of the database system and/or the network is increased.

In order to increase the efficiency of database systems, embodiments of the present disclosure can perform application-based query transformation. This can be more efficient than query based query transformation. Application-based query transformation can combine related portions of two or more queries and/or an action from an application. The combination/merging of queries can reduce the network communication costs associated with distributed database systems. The reduction in cost can be based on reducing the number of messages sent between a host and the database. Additionally, the combination of queries can reduce the computing costs in a database system. The reduction can be based on reducing the number of data writes and/or the number of input/output (I/O) actions necessary to fully execute the queries. Query transformation can be the process of reading, parsing, generating an access plan and executing a query.

Embodiments of the present disclosure include a query manager to configured to perform application-based query transformation. The query manager may combine two or more queries from an application to reduce network traffic and/or I/O instructions in the host/application.

In some embodiments, the application-based query transformation is based on an application query performance architecture. In some embodiments, the architecture can be divided into three levels from lowest to highest, database internal, database interact, and database external. Combining queries/sections at lowest possible levels provides a greater increase in performance. In some embodiments, each of the levels can be divided into two or more levels. The database internal can include a query level, below a runtime node level. The database interact level can include an inline code level below and outline code level. The database external level can include an application local under an application remote.

In some embodiments, the query manager can identify all the queries in an application program/thread/string. In some embodiments, the queries are generated by the application. In some embodiments, the queries are pre-programed (coded) into the application. Each query can be configured to retrieve data from one or more of databases, tables, columns, and/or other data storage category.

In some embodiments, the query manager can identify/determine actions performed between two queries by the application. The query manager can scan/analyze the application string to identify actions and the order of the actions queries to be performed by the application. In some embodiments, each action is correlated to a level in the hierarchy.

In some embodiments, the query manager identifies execution units in the application string. An execution unit can be a logical grouping of instructions. In some embodiments, each query and each action between queries can be an execution unit. In some embodiments, the query manager can identify relationships between each execution unit. The relationship can be based on the execution units including a common attribute. The attribute can be a data type, a piece/set of data (e.g., one row from a database), a column, a predicate, a source table, and the like.

In some embodiments, the query manager can build a QDG that can show relationships/dependencies between execution units. Each execution unit can be a node in the QDG. In some embodiments, the query manager can merge nodes of the QDG. The merging can be based on the action and its associated hierarchy level. Merged nodes can be a section of the QDG. Any number of nodes can be merged into a section. The QDG can include any number of sections.

In some embodiments, the query manager executes the application based on the QDG. At the appropriate time, based on an application instruction, the query manager can send the first section to a database to be processed, receive the results, and insert the results at the correct location in the application string. The timing of the first section can be the same time a first query of the string of queries would be sent to the database. This continues until all sections of the QDG have been processed and the application outputs the results.

The aforementioned advantages are example advantages, and embodiments exist that can contain all, some, or none of the aforementioned advantages while remaining within the spirit and scope of the present disclosure.

Figure 4:
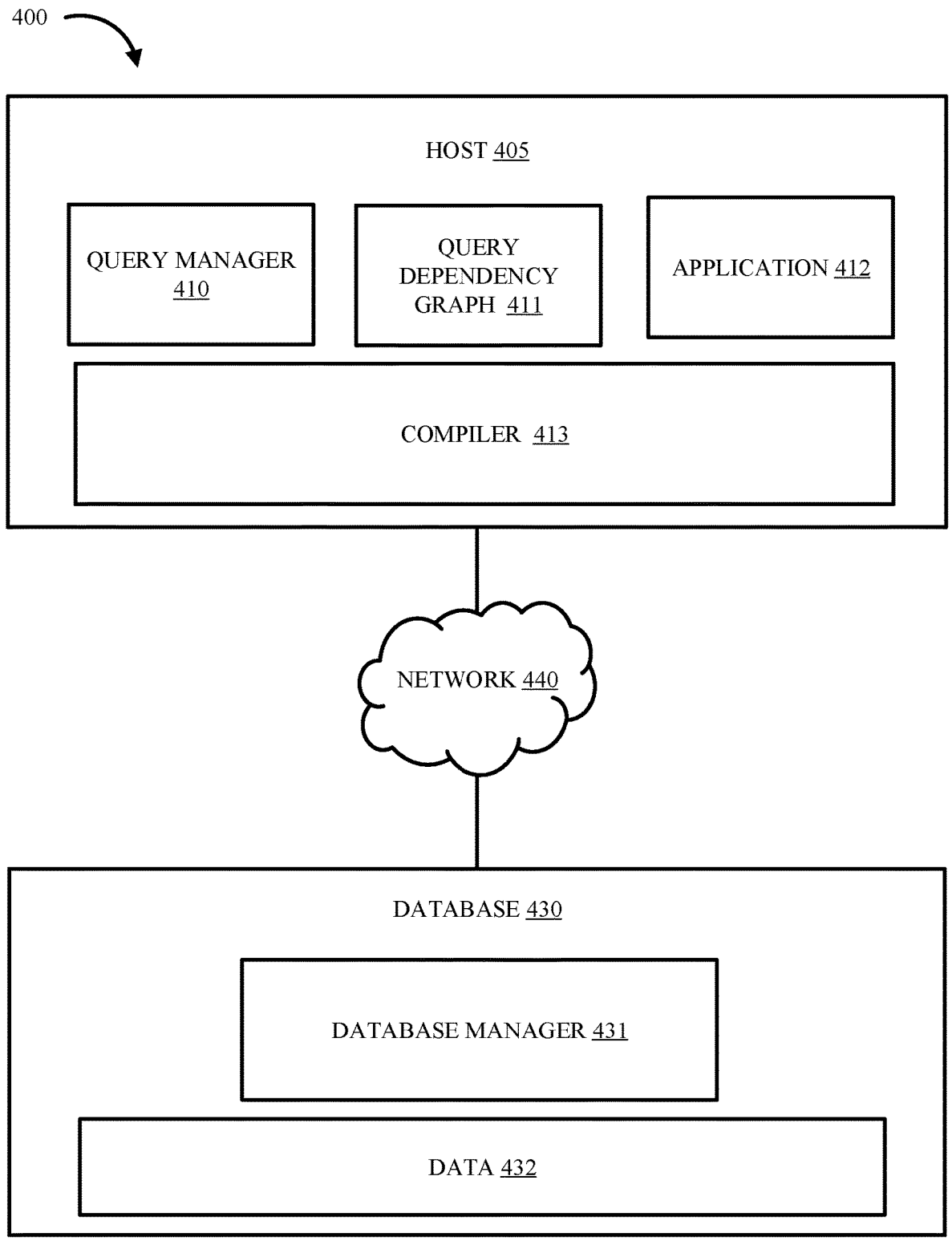
FIG. 4 illustrates a functional diagram of a computing environment suitable for operation of a query manager in accordance with some embodiments of the present disclosure.

Referring now to various embodiments of the disclosure in more detail, FIG. 4 is a representation of a computing environment 400, that is capable of running a query manager in accordance with one or more embodiments of the present disclosure. Many modifications to the depicted environment may be made by those skilled in the art without departing from the scope of the disclosure.

Computing environment 400 includes host 405, database 430, and network 440. Network 440 can be, for example, a telecommunications network, a local area network (LAN), a wide area network (WAN), such as the Internet, or a combination of the three, and can include wired, wireless, or fiber optic connections. Network 440 may include one or more wired and/or wireless networks that are capable of receiving and transmitting data, voice, and/or video signals, including multimedia signals that include voice, data, and video information. In general, network 440 may be any combination of connections and protocols that will support communications among and between host 405, database 430, and other computing devices (not shown) within computing environment 400. In some embodiments, host 405 and database 430 may each include a computer system, such as the data processing system 100.

Host 405 can be a standalone computing device, a management server, a web server, a mobile computing device, or any other electronic device or computing system capable of receiving, sending, and processing data. In other embodiments, host 405 can represent a server computing system utilizing multiple computers as a server system, such as in a cloud computing environment 50. In some embodiments, host 405 represents a computing system utilizing clustered computers and components (e.g., database server computers, application server computers, etc.) that act as a single pool of seamless resources when accessed within computing environment 400. In some embodiments, host 405 includes query manager 412, QDG 411, application 412 and compiler 413. In some embodiments, host 405, query manager 412, QDG 411, application 412, and compiler 413 can be located in separate/independent computing devices.

Query manager 410 can be any combination of hardware and/or software configured to manage queries. In some embodiments, query manager 410 includes a database management system (DBMS). In some embodiments, query manager 410 is part of a federated database system (which can include database 430). A federated database system can transparently map multiple autonomous database systems into a single federated (combined) database. In some embodiments, a federated database system acts as a virtual database, where there is no actual data integration in the constituent databases. In some embodiments, query manager can include application 412, QDG 411, and compiler 413 and/or the functionality of these components. However, they are shown as separate for discussion purposes. In some embodiments, query manager 410 can send nodes and/or sections of QDG 411 to database 430

QDG 411 can be a graph that shows a relationship between one or more queries and/or actions in a string of an application. In some embodiments, QDG 411 can show a relationship between execution units. QDG 411 can have one or more nodes connected by one or more links/edges. Each edge can represent a common factor in the two nodes connected by the edge. In some embodiments, the edge can include a level of the hierarchy. The included level can be based on actions performed by the application between the two queries. The common factor can be a common table, a common column, a column predicate, and/or the like. In some embodiments, each edge can indicate relative order of execution/order of operation. The execution order can be the order in which each execution unit would be processed by the application.

In some embodiments, QDG 411 can include a node for each execution unit. The edges/links between the nodes will represent a relationship based on one or more attributes and/or a relative sequence. The edge can be an arrow to show dependency. For example, using example 1, the application performs a function between the two queries. The first query can be a node, with an edge pointing to a second node. The second node can represent the function. The second node includes a second edge pointing to a third node, the third node representing the second query. In some embodiments, a first query in the application can be correlated to a first node and/or a top node of QDG 411.

In some embodiments, QDG 411 can include two or more separate graphs. In some embodiments, each of the two or more graphs can be correlated to a different thread of application 412. In some embodiments, the two or more graphs can be correlated to a single thread of the application. For example, a string can have four queries. The first query can be related to the second query, and the third query can be related to the fourth query. But, neither of the first or second query are related to either of the third or fourth query. In some embodiments, QDG 411 can include one or more sections. A section can include two or more execution units that are merged. QDG 411 can retain the original and the merged structure.

Application 412 can be any combination of hardware and/or software that is configured to generate/execute one or more queries. In some embodiments, the one or more queries can be part of the application program. A query can be a request for data and/or information stored in one or more tables of one or more databases and/or an instruction to insert data into the tables. The databases may be local (e.g., on host 405), or remote (e.g., database 430). In some embodiments, application 412 can have one or more threads/modules/strings operating in parallel. Each thread can have one or more queries. In some embodiments, each string can be correlated to a unique QDG 411. Application 412 can also include one or more actions between each query. For example, a first query can retrieve data, the application can manipulate the data, and a second query can return the manipulated data to the database 430. The actions can include simple commands, conditional commands, function, and functions with parameters.

In some embodiments, the query is written in SQL. In some embodiments, application 412 displays the results of the query. The results may be returned in an SQL format, and/or as images, graphs, trends, and/or other similar formats. In some embodiments, application 412 is part of a computing device separate from host 405. The computing device may communicate with host 405 via network 440. In some embodiments, the computing device can generate queries, send queries to host 405, and/or receive and display the results of the query.

Compiler 413 can be any combination of hardware and/or software configured to analyze and combine queries of an application. In some embodiments, compiler 413 can identify/determine all queries and/or actions in an application thread. The identification can be based on an analysis of the application string. The analysis can read ahead (or scan the code) to identify queries and/or actions by the application. In some embodiments, the identification is based on previously running the application string. After the previous execution, compiler 413 can store each query performed and each action performed on the query data. Compiler 413 can access the stored data based on one or more identifiers associated to the application string and the stored data. In some embodiments, the identification can be pre-configured into the application. In some embodiments, compiler 413 can identify each action of an application between the two or more queries.

In some embodiments, compiler 413 can separate the application thread into execution units. An execution unit can be a query and/or an action between the queries. In some embodiments, compiler 413 can parse each query and/or each action. The parsing can identify features/attributes that are being used/manipulated by the application. An attribute can be a column, a table, a data type, predicates, functions, logics, and other similar factors.

In some embodiments, compiler 413 can generate a QDG 411. In some embodiments, the QDG 411 is based on the identified execution units. Each execution unit can be compared against one or more previous and/or one or more subsequent execution units to identify common attributes in the execution unit (e.g., column, data type, variable, etc.). The relative sequencing of the execution units can be based on the order they appear in the application. For example, the order the queries appear in a string can be used to establish the relative sequence. And the structure of the query can provide the sequencing for intra query execution units.

Figure 5:
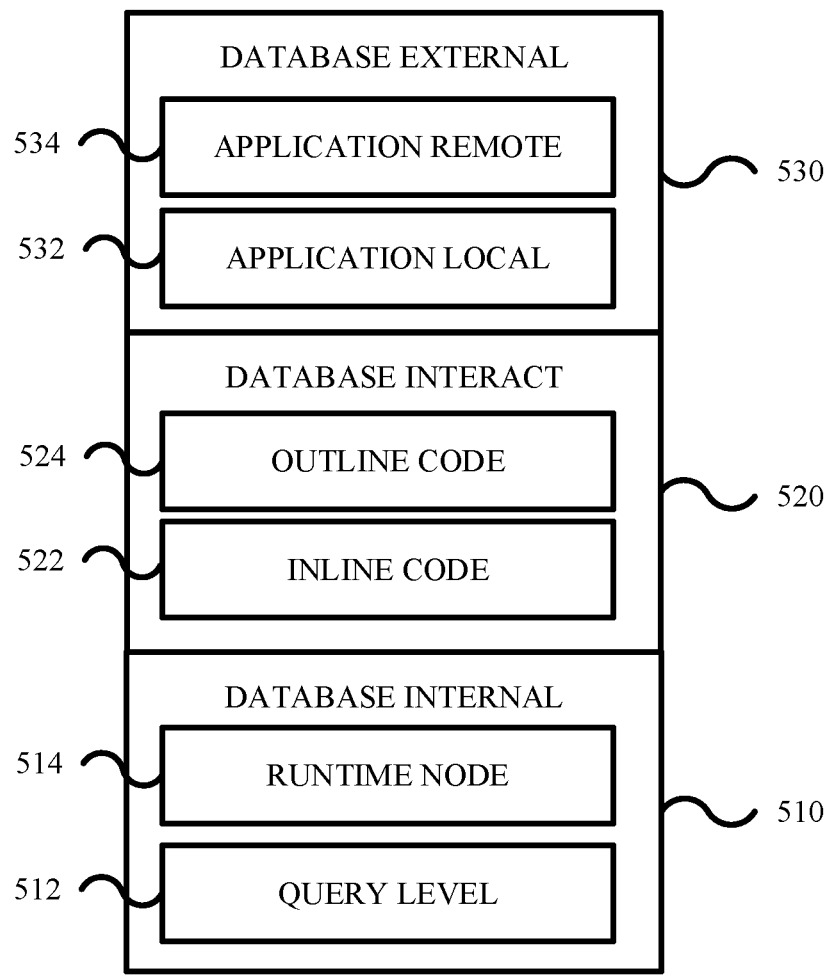
FIG. 5 illustrates a functional diagram of an application-based database performance architecture, in accordance with some embodiments of the present disclosure.

One embodiment of the architecture is depicted in FIG. 5. In some embodiments, the architecture can be divided into three levels from lowest to highest, database internal 510, database interact 520, and database external 530. Combining queries/sections at lower levels provides a greater increase in performance. In some embodiments, each of the levels can be divided into two or more levels. The database internal 510 can include a query level 512, below a runtime node 514. The database interact 520 level can include an inline code 522 below and outline code 524. The database external 530 level can include an application local 532 under an application remote 534.

In some embodiments, compiler 413 can attempt to combine/merge each node with all adjoining nodes. The attempt to combine can include checking at each level and selecting the lowest level of the architecture that is successful. In some embodiments, the compiler attempts to join the nodes at the lowest level, and in response to an unsuccessful joining, moves up to the next level. This may be repeated until the nodes are joined or the highest level is reached. An unsuccessful join can include a determination that the nodes cannot be joined at that level. In some embodiments, two or more nodes that have been joined can have a third/subsequent node joined by the same process. In some embodiments, each action is surrounded by two queries. One query will precede the action and one query will follow the action.

Consider example 1 that has two queries. A first query can select, from table T values X and Y from columns A and B respectively for a row where column Z is equal to value Z. A second query can write, to table T, the values of X, Y, and Z into columns A, B, and C where the application can perform and action on the values between the two queries. In some embodiments, combining at the query level includes merging two or more queries/execution nodes into a single node.

In some embodiments, two or more execution nodes can be combined/merged at the query level. The queries can be merged at the query level when there is a simple action (simple addition/subtraction, simple substitution, etc.) and/or no action performed on the values. For example, if the only action between the two queries of example 1 is $X=X+5$, then the two queries can be combined into a single query. The new single query can be generated/rewritten to encompass both the first query and the second query. The new query can identify the relevant rows and change the value of X. Thus, there is no need to return the results of the first query to the application, write the results into the application, then resend the manipulated values back to the database.

In some embodiments, two or more execution nodes can be combined at the runtime node level. The queries can be merged at the runtime node level when there is a conditional simple equation (e.g., if . . . then . . . , etc.) between the queries. For a conditional action, the two queries cannot be directly combined as in the query level, because there is no means of determining whether the condition is met prior to sending the first query. For example, if the only action between the two queries of example 1 is "If X<10, then $X=X+5$", then the two queries can be represented as a runtime node. The runtime node can be a conditional node. A conditional runtime node can be part of the runtime structure in a database. The conditional node can have multiple branches, only one of which is executed, based on whether a condition is met. When sent to the database, the queries combined at the runtime node level can include a conditional runtime node structure.

In some embodiments, two or more execution nodes can be combined at the inline code level. the queries can be merged at the inline code level when the action between the queries is a small function. A small function is a function that can be set in the database address space. In the inline code level, the code to carry out the function can fit into the same address the space as the runtime execution code. Or said differently, the function can be represented as a function node in the database runtime. For example, if the only action between the two queries of example 1 is $X=$function$(X)$, and the function can fit into the same runtime space, then the two queries can be represented as a function node. The function can be defined by the application.

In some embodiments, two or more execution nodes can be combined at the outline code level. In the outline code level, the code to carry out the function of the application can fit into the allied address space. The allied address space can be used to store the functionality from the application to properly process the data. The allied address space is a process space outside the main database process. The outline code can be similar to the inline code level except the function is too big/too complex to fit into the database address space. The outline code function can be represented as a function node with a call to the allied address space.

In some embodiments, two or more execution nodes can be combined at the application local level. Queries can be merged in the application local level when there is a function with an application parameter between the two queries. For example, the application local level can be applied if the only action between the two queries of example 1 is $X=$Function $(X, $ Parameter$)$. Then the function can be set in the allied address space (similar to the outline code), with a call to obtain the parameter from the application. This will require an additional data transfer between the database and the application. However, the size of the transfer will be smaller and the amount of I/O will be less because only the parameter is being transferred rather than all the data requested in the first query.

In some embodiments, the highest level of the hierarchy is the application remote 534 level. Queries can be merged in the application local 532 level when there is complex application logic applied to the data between the two queries. In some embodiments, execution units that fall into the application remote 534 level are not combined. In some embodiments, the execution units assigned to the application remote 534 level can act as boundary for merging queries. Said differently, no queries on either side of the this level are merged.

Database 430 can be any combination of hardware and/or software configured to store data in a database system. In some embodiments, database 430 is part of a federated database system. A federated database system can be any number databases that appear as a single database to the requesting device (e.g., host 405, application 412, etc.). In some embodiments, database 430 includes two or more databases communicatively connected that can act as a single database. In some embodiments, database 430 may be contained within host 405. In some embodiments, database 430 can include database manager 431, and data 432.

Database manager 431 can be any combination of hardware and/or software configured to oversee execution of an SQL query in database 430. In some embodiments, database manager 431 can generate an access plan. The access plan can be based on QDG 411. In some embodiments, the access plan includes runtime nodes generated by compiler 413 during merging.

In some embodiments, database manager 431 can generate an access path for the received queries. The received queries can be the merged queries. An access path shows a sequence of events the database will perform to fully execute the query, and if needed, return the data. In some embodiments, the access path is based on the combined execution units. For example, if the received query included a conditional node and a function node, the access plan will include those nodes as delivered. This ensures the queries are executed as directed by the application.

In some embodiments, database statistics keep a record of each query received. This can include the source of the query (e.g., application 412), the structure, the target data, and other similar data. In some embodiments, the records can be used as training data. For each query, all the data that can be used as training data (as described above) is stored. In some embodiments, the training data is stored based on source query. In some embodiments, the training data is stored by mini plan type. In some embodiments, the training data can be updated after each new query is executed and the statistics/data is recorded.

Data 432 can be any data structure configured to store and organize data. In some embodiments, data 432 can include one or more data structures. The data structures can include tables, indices (indexes), columns, and the like. The data structures can be the target of the queries. Data 432 can include one or more separate tables and/or one or more indexes. Each table/index can include one or more columns. In some embodiments, data 432 is a target of queries.

Figure 6:
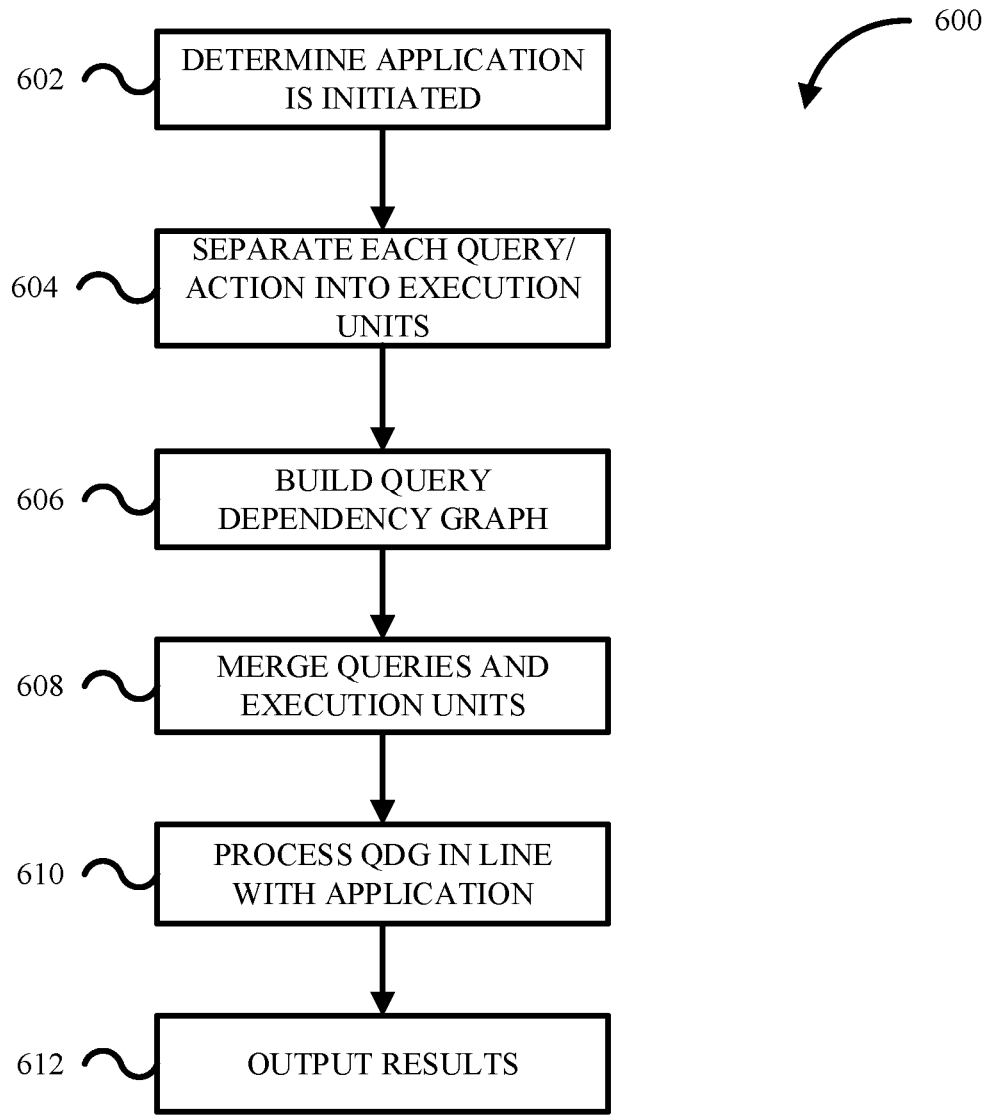
FIG. 6 illustrates a flow chart of an example method for application-based query transformation, in accordance with some embodiments of the present disclosure.

FIG. 6 depicts a flowchart of an example method, method 600, for combining two or more queries in an application that can be performed in a computing environment (e.g., computing environment 400 and/or cloud computing environment 50). One or more of the advantages and improvements described above for application-based query transformation may be realized by method 600, consistent with various embodiments of the present disclosure.

Method 600 can be implemented by one or more processors, query manager 410, QDG 411, application 412, compiler 413, database 430, database manager 431, data 432 and/or a different combination of hardware and/or software. In various embodiments, the various operations of method 600 are performed by one or more of query manager 410, application 412, compiler 413, database 430, database manager 431, and/or other component of computing environment 400. For illustrative purposes, the method 600 will be described as being performed by query manager 410.

At operation 602, query manager 410 determines an application is initiated. In some embodiments, the determination is based on query manager 410 receiving a notification from the application and/or an operation system. In some embodiments, the application includes one or more queries with an action between queries. The action can be no action/no manipulation. Once an application is operating, query manager 410 can monitor that application for a new thread/string to be initiated. In some embodiments, query manager 410 determines that one or more threads of the application has been initiated. In some embodiments, query manager 410 can monitor for an application to be initiated.

In some embodiments, the determination is based on query manager 410 receiving a query from the application. The query can include a source application and a thread. In some embodiments, the source of the query can be based on the return instruction.

At operation 604, query manager 410 identifies all execution units in the application. In some embodiments, each query and/or each application action can be an execution unit. In some embodiments, operation 608 can include identifying one or more attributes (a set of attributes) associated with each execution unit. The attributes can indicate a target of the query/action. For example, if a third query retrieves data from Table A, Column 1, 2, and 3, then each of table A, column 1, column 2, and column 3 can be attributes of the third query. In another example, if a third action performs function X on column 2, then the function table A and column 2 can be attributes for the third action.

In some embodiments, operation 604 includes identifying queries in the application. In some embodiments, query manager 410 can read ahead in the application thread to identify any queries. In some embodiments, the application can send all queries in the string. The application sending the queries can be based on query manager 410 requesting the queries. In some embodiments, the application can be pre-configured to provide all queries in a string to query manager 410.

In some embodiments, operation 604 includes identifying all actions performed by the application related to the queries. In some embodiments, the actions performed can be identified in a manner consistent with the identification of the queries in the threat. Query manager 410 can read ahead, request, and/or receive the actions from the application. In some embodiments, each identified action can be correlated to a level of an application performance architecture as depicted in FIG. 5 (the architecture/hierarchy).

At operation 606, query manager 410 builds a QDG 411. In some embodiments, the QDG 411 can be based on the execution units. Each execution unit can be a node of the QDG 411. Each node can be connected to another node by an edge. In some embodiments, each pair of connected nodes in the QDG 411 have at least one attribute in common. Continuing the above examples, the third query and the third action can be connected based on having table A and/or column 2 as common attributes. In some embodiments, the edge can represent a relative order of operations. The order can represent the order the actions would be performed by the application or the database without any action by query manager 410. In some embodiments, the relative order can be based on an attribute depending on a previous node. For example, the third action is dependent on the third query because the value of the third query is required to perform the function.

At operation 608, query manager 410 merges two or more execution units. In some embodiments, the merging can be based on the performance hierarchy. In some embodiments, the merging is based on the identified actions. In some embodiments, each identified action can be correlated to a level of the hierarchy. In some embodiments, two or more queries can be merged with one or more actions to create a new query (or section of the QDG 411). A section can be used to identify two or more nodes that have been merged. In some embodiments, nodes can be merged into a section. It can be advantageous to merge as many of the nodes as feasible into the least number of sections. In some embodiments, all nodes are merged up to an action that is correlated to application remote 534 level. In some embodiments, query manager 410 can merge a predetermined number of queries and/or actions. It can be based on a number of queries and/or a number of actions in any combinations. For example, no more than four queries can be joined.

In some embodiments, the merging includes generating one or more runtime nodes (e.g., function node, conditional node, etc.) as discussed above. In some embodiments, the merging includes adding application functions into the one or more nodes (e.g., inline code 522, etc.) as discussed above. In some embodiments, the merging includes inserting a call for an application parameter (e.g., application local 532).

At operation 610, query manager 410 processes/executes the QDG 411 according to application instructions. In some embodiments, the execution can include running the application string. When the first query would be sent to the database, query manager 410 will send all merged queries (e.g., the section) to be processes by the database. In some embodiments, the database 430 will execute the section as if it was the query originally written into the application string.

In some embodiments, operation 616 includes executing the QDG 411 section. The database can parse and optimize the query. In some embodiments, the database 430 can use, without changing, the runtime nodes generated during the merging of operation 612. In some embodiments, the database 430 will return the executed section to query manager 410. In some embodiments, query manager 410 manager can input the data into the application string at the end of the last merged execution unit. The application can continue processing as if no changes were made to any queries. In some embodiments, the host can shift some processing of the application to the database 430. This can reduce network traffic and I/O in the host and the database 430 without any change to the final output of the application. Thus, the generation of the access path and execution of the query is based on the application rather than on each individual query.

In some embodiments, the database 430, in response to an error in the section, can return the section to query manager 410. Query manager 410 will then unmerge the queries where the error occurred. Said differently, query manager 410 can separate the section into two sections and re-send the first of the two sections. The database 430 can provide a location of the error. In some embodiments, in response to the error, the application string is executed with no merging of execution units.

At operation 612, query manager 410 outputs the results of the application. In some embodiments, the application can be agnostic to the actions of query manager 410 and will output according to the application instruction. In some embodiments, query manager 410 notifies the application that the queries are complete.

Computer Technology and Computer Readable Media

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    determining an application is initiated;
    identifying, by a compiler, a set of execution units included in the application, wherein the set of execution units is comprised of a set of queries in the application and a set of actions in the application;
    building, by the compiler and based on the set of execution units, a query dependency graph (QDG) comprising a plurality of nodes, wherein each node of the plurality of nodes is correlated to an execution unit, and each node is linked to at least one additional node, the link indicating a relative execution order and a common attribute of each node and the additional node;
    merging, by the compiler and based on a performance architecture, two or more of the set of execution units into a section, wherein each action of the set of actions is correlated to a level of the performance architecture and the performance architecture includes a query level, a runtime node level, an inline code level, an outline code level, an application local level, and an application remote level; and
    processing the application according to the QDG.

2. The method of claim 1, wherein a first action is correlated to the query level, and the merging further comprises:
    combining, in response to the first action being a simple command, a first query, a second query, and the first action, into a first section.

3. The method of claim 1, wherein a second action is correlated to the runtime node level, and the merging further comprises:
    combining by a conditional runtime node, in response to the second action being a conditional equation, a first query, a second query, and the second action, into a second section.

4. The method of claim 1, wherein a third action is correlated to the inline code level, the merging further comprising:
    combining by a function runtime node, in response to the third action being an application function, a first query, a second query, and the third action, into a third section, wherein the third section can run in a database address space.

5. The method of claim 1, wherein a fourth action is correlated to the outline code level, the merging further comprising:
    combining by a function runtime node, in response to the fourth action being an application function, a first query, a second query, and the fourth action, into a fourth section, wherein the fourth section cannot run in a database address space, but can run in an allied address space.

6. The method of claim 1, wherein a first query of the set of queries is correlated to a top node of the QDG, and the first query is a first execution unit of the relative execution order.

7. The method of claim 1, wherein each action of the set of actions is surrounded by two queries of the set of queries.

8. The method of claim 1, wherein the first section includes at least two queries of the set of queries and one action of the set of actions.

9. The method of claim 1, wherein a value of the common attribute of a first node is an input into the at least one additional node.

10. The method of claim 1, wherein each query of the set of queries is a static query.

11. A system comprising:
a processor;
a computer-readable storage medium communicatively coupled to the processor and storing program instructions;
a performance architecture that includes three levels, a first level is a database internal level, a second level is a database interact level, and a third level is a database external level, wherein each level is configured to merge two or more queries;
a compiler configured to:
identify a set of execution units in an application, wherein the set of execution units is comprised of a set of queries in the application and a set of actions in the application;
assign each action to a level of the performance architecture;
build, based on the set of execution units, a query dependency graph (QDG) for the application, wherein the QDG comprises a plurality of nodes, each node correlated to an execution unit of the set of execution units, and each node includes a link to at least one additional node of the plurality of nodes, and the link indicates a relative order of operation of the node and the at least one additional node; and
merge two or more execution units into a section, wherein the merging is based on the level assigned to each action and on the performance architecture; and
a database configured to:
receive the section from the compiler;
process the section according to the QDG; and
return the processed section to the compiler.

12. The system of claim 11, wherein the section includes as least two queries of the set of queries and one action of the set of actions.

13. The system of claim 11, wherein the first level includes a query level below a runtime node level, wherein the performance architecture is further configured to:
for each action correlated to the query level, directly merge an action with a preceding query and a subsequent query into a new query;
for each action correlated to the runtime node level, merge by a conditional runtime node the action with the preceding query and the subsequent query into a new query.

14. The system of claim 13, wherein the second level includes an inline code level below and outline code level, wherein the performance architecture is further configured to:
for each action correlated to the inline code level, merge by a function runtime node the action with the preceding query and the subsequent, wherein the function runtime node is executed in a database address space; and
for each action correlated to the outline code level, merge by the function runtime node the action with the preceding query and the subsequent, wherein the function runtime node is executed in an allied database address space.

15. The system of claim 14 wherein the third level includes a database local level, and a database remote level, wherein the performance architecture is further configured to:
for each action correlated to the database local level, merge by the function runtime node the action with the preceding query and the subsequent, wherein the function runtime node is executed in the allied database address space and includes a call to obtain application parameters related to the function runtime node.

16. A computer program product, the computer program product comprising a computer readable storage medium having program instructions embodied therewith, the program instructions executable by a processing unit to cause the processing unit to:
determine an application is initiated;
identify, by a compiler, a set of execution units included in the application, wherein the set of execution units is comprised of a set of queries in the application and a set of actions in the application;
build, by the complier and based on the set of execution units, a query dependency graph (QDG) comprising a plurality of nodes, wherein each node of the plurality of nodes is correlated to an execution unit, and each node is linked to at least one linked node, the link indicates a relative order of operation and a common attribute the node and the linked node;
merge, by the compiler and based on a performance architecture, two or more of the set of execution units into a section, wherein the performance architecture includes a query level, a runtime node level, an inline code level, an outline code level, an application local level, and an application remote level; and
process the application according to the QDG.

17. The computer program product of claim 16, wherein each action of the set of action is correlated to a level of the performance architecture.

* * * * *